United States Patent
Liu et al.

(10) Patent No.: US 12,525,809 B2
(45) Date of Patent: Jan. 13, 2026

(54) METHOD FOR CONTROLLING BATTERY CHARGING/DISCHARGING CURRENT IN OFF-GRID MODE OF HYBRID ENERGY STORAGE INVERTER

(71) Applicant: SolaX Power Network Technology (Zhejiang) Co., Ltd., Hangzhou (CN)

(72) Inventors: Chaohou Liu, Hangzhou (CN); Haichao Guan, Hangzhou (CN); Tianhong An, Hangzhou (CN); Qikang Wei, Hangzhou (CN)

(73) Assignee: SolaX Power Network Technology (Zhejiang) Co., Ltd., Hangzhou (CN)

( * ) Notice: Subject to any disclaimer, the term of this patent is extended or adjusted under 35 U.S.C. 154(b) by 0 days.

(21) Appl. No.: 18/957,188

(22) Filed: Nov. 22, 2024

(65) Prior Publication Data

US 2025/0088009 A1     Mar. 13, 2025

Related U.S. Application Data

(63) Continuation of application No. PCT/CN2022/098122, filed on Jun. 10, 2022.

(30) Foreign Application Priority Data

May 23, 2022    (CN) .......................... 202210560323.0

(51) Int. Cl.
*H02J 3/38*      (2006.01)
*H02J 3/32*      (2006.01)
*H02J 7/00*      (2006.01)
*H02J 7/35*      (2006.01)

(52) U.S. Cl.
CPC ................ *H02J 3/388* (2020.01); *H02J 3/32* (2013.01); *H02J 7/0063* (2013.01); *H02J 7/0068* (2013.01); *H02J 7/00712* (2020.01); *H02J 7/35* (2013.01); *H02J 2207/20* (2020.01); *H02J 2300/26* (2020.01)

(58) Field of Classification Search
CPC ...... H02J 3/38; H02J 3/388; H02J 7/00; H02J 7/00712; H02J 3/32; H02J 7/0063; H02J 7/0068; H02J 7/35; H02J 2207/20; H02J 2300/26
See application file for complete search history.

(56) References Cited

FOREIGN PATENT DOCUMENTS

CN        110932327 A    *   3/2020  ............... H02J 9/06

* cited by examiner

*Primary Examiner* — Robert L Deberadinis
(74) *Attorney, Agent, or Firm* — Westbridge IP LLC

(57) ABSTRACT

Disclosed is a method for controlling battery charging/discharging current in an off-grid mode of a hybrid energy storage inverter that is based on photovoltaic and a lithium battery. If photovoltaic energy is sufficient and a battery is not fully charged, the photovoltaic energy is supplied to a load and excess energy is supplied to the battery, to achieve maximum power point tracking of an output power of a photovoltaic component achieves maximum power point tracking; if photovoltaic energy is sufficient and a battery has been fully charged, the photovoltaic energy is supplied to a load, the excess photovoltaic energy is prohibited from charging the battery to prevent overcharging of the lithium battery; if photovoltaic energy is insufficient, the photovoltaic energy and battery energy are jointly supplied to a load, to achieve maximum power point tracking of an output power of a photovoltaic component.

7 Claims, 1 Drawing Sheet

METHOD FOR CONTROLLING BATTERY CHARGING/DISCHARGING CURRENT IN OFF-GRID MODE OF HYBRID ENERGY STORAGE INVERTER

CROSS-REFERENCE TO RELATED APPLICATIONS

This application is a continuation of International Application No. PCT/CN2022/098122, filed on Jun. 10, 2022, which claims priority to Chinese Patent Application No. 202210560323.0, filed on May 23, 2022. The disclosures of the aforementioned applications are hereby incorporated by reference in their entireties.

TECHNICAL FIELD

The present application pertains to the field of circuit control technologies, and in particular, to a method for controlling battery charging/discharging current in an off-grid mode of a hybrid energy storage inverter.

BACKGROUND

In recent years, photovoltaic power generation has been developed rapidly with support of national policies, and installed capacity of photovoltaic power generation has increased year by year. However, photovoltaic power generation is greatly affected by environmental factors and cannot provide energy at night. Therefore, in order to achieve a stable supply of new energy and reduce an impact of photovoltaic energy on traditional power grid systems, energy storage systems equipped with batteries or lithium batteries have been promoted, especially in remote areas where mains supply is unstable, household energy storage inverters may provide users with stable alternating current power in a case where the mains supply is lost, ensuring uninterruptible power supply of a household appliance for users. More and more users choose to install a hybrid energy storage inverter.

When the mains supply is stable, the hybrid energy storage inverter works in a grid-connected mode. When the photovoltaic energy is sufficient, in addition to being supplied to a household load, excess energy is stored in a battery; and when the photovoltaic energy is insufficient to maintain power supply of the load, the battery discharges to maintain the power supply of the load.

When the mains supply is lost, the hybrid energy storage inverter works in an off-grid mode to provide stable alternating current power supply for a household appliance. In this case, if the photovoltaic energy is sufficient, excess energy may be stored in the battery; however, there is a problem that if the battery has already been fully charged at this time, when the excess photovoltaic energy continues to be stored in the battery, battery overvoltage or even damage will be caused. Therefore, how to solve the problem of preventing a lithium battery from overcharging in an off-grid mode of a hybrid energy storage inverter becomes an urgent problem to be solved.

SUMMARY

To resolve the foregoing technical problem, a specific technical solution of a method for controlling battery charging/discharging current in an off-grid mode of a hybrid energy storage inverter in the present application is as follows.

A method for controlling battery charging/discharging current in an off-grid mode of a hybrid energy storage inverter that is based on photovoltaic and a lithium battery is provided and includes the following steps:
Setting a bus voltage reference value.
Controlling on a photovoltaic (PV) side and a battery side.
Setting a specific control method in each state, where the specific control method includes:
  in a case that photovoltaic energy is sufficient and a battery is not fully charged, supplying the photovoltaic energy to a load and excess energy to the battery, to achieve maximum power point tracking of an output power of a photovoltaic component;
  in a case that photovoltaic energy is sufficient and a battery has been fully charged, supplying the photovoltaic energy to a load, to prohibit photovoltaic excess energy from charging the lithium battery;
  in a case that photovoltaic energy is insufficient, jointly supplying the photovoltaic energy and battery energy to a load, to achieve maximum power point tracking of an output power of a photovoltaic component; or
  in a case that there is no photovoltaic energy, supplying battery energy to a load.

Further, the setting a bus voltage reference value includes: when the hybrid energy storage inverter works in an off-grid mode, providing an alternating current power supply with an effective value of 220V for a load side; and setting a standard direct current bus voltage reference value to StandardBusRef, a PV side bus voltage reference value to PvBusRef, a battery side bus voltage reference value to BatBusRef, and a battery side bus voltage overvoltage reference value to BatOvBusRef. To enable a DC/AC inverter circuit to meet an alternating current voltage output condition, the standard direct current bus voltage reference value that is set is StandardBusRef=Urms*1.414+35, and Urms denotes an effective value of a voltage; and
  when an output voltage reference value UpvRef of an MPPT algorithm is less than StandardBusRef, a DC/DC control circuit on a PV side works in a boost mode; and in this case, PvBusRef=StandardBusRef;
  when an output voltage reference value UpvRef of an MPPT algorithm is greater than or equal to StandardBusRef, a DC/DC control circuit on a PV side works in a bypass mode; and in this case, PvBusRef=UpvRef+5;
  BatBusRef=PvBusRef−5; and
  BatOvBusRef=PvBusRef+20.

Further, the controlling on a PV side and a battery side includes:
Controlling on a PV side.
Controlling of the PV side includes a control loop 1, a control loop 2, and a control loop 3, in the control loop 1, a difference between a target value UpvRef from maximum power point tracking MPPT of the photovoltaic component and a current output voltage Upv of the photovoltaic component passes through a controller PI, to output IpvRef1; in the control loop 2, a difference between PvBusRef and a bus voltage Ubus passes through a controller PI, to output IpvRef2; and a minimal value of IpvRef1 and the IpvRef2 is used as a reference value IpvRef of the control loop 3, in the control loop 3, a difference between IpvRef and an output current Ipv of the photovoltaic component passes through a controller PI, to output a duty ratio control signal duty1 of a PV side DC/DC converter, and the duty1 is converted into a switch signal to control turning on and turning off of S1.
Controlling on a battery side.
Controlling of the battery side includes a control loop 4, a control loop 5, and a control loop 6. In the control loop 4, a difference between BatBusRef and a bus voltage Ubus passes through a controller PI to output a value, a minimal value of the value that is output and Ichargelimit is selected, and then a maximum value of the minimal value that is selected and Idischargelimit is used as a first reference value IbatRef1 of current of the battery. Ichargelimit denotes a maximum allowable charging current value of the battery, Idischargelimit denotes a maximum allowable discharging current value of the battery, and it is defined that a charging current of the battery is in a positive direction and a discharging current of the battery is in a negative direction, so that Ichargelimit is a value greater than or equal to zero, and Idischargelimit is a value less than or equal to zero.

In the control loop 5, a difference between BatOvBusRef and a bus voltage Ubus passes through a controller PI, to output a second reference value IbatRef2 of current of the battery, and a maximum value of IbatRef1 and IbatRef2 is used as a reference value IbatRef of current of the battery for the control loop 6. In the control loop 6, a difference between IbatRef and Ibat of current of the battery passes through a controller PI to output a duty ratio control signal duty2 of a battery side DC/DC converter, and the duty2 is converted into a switch signal to control turning on and turning off of S2 and S3.

Further, in the case that photovoltaic energy is sufficient and a battery is not fully charged, the supplying the photovoltaic energy to a load and excess energy to the battery, to achieve maximum power point tracking of an output power of a photovoltaic component includes the following specific steps:

According to the control loop 4, the reference value BatBusRef is PvBusRef−5, so that when the bus voltage Ubus is greater than PvBusRef−5, an output of the control loop 4 is greater than 0, which indicates that the battery is being charged, and if the battery is not fully charged and charge flow IchargeLimit is not limited, the bus voltage Ubus is maintained at PvBusRef−5. In this case, according to the control loop 2, the difference between PvBusRef and the bus voltage Ubus passes through the controller PI, to output IpvRef2, and because Ubus is maintained at PvBusRef−5, IpvRef2 reaches a saturation value. A minimal value of IpvRef1 and IpvRef2 is used as the reference value IpvRef of the PV side current, because IpvRef2 reaches a saturation value, IpvRef is equal to IpvRef1. Thus, in this case, the reference value of the control loop 3 is directly obtained from the control loop 1, and a reference value UpvRef of the control loop 1 is the target value of the MPPT, so that maximum power point tracking control of the photovoltaic component may be implemented.

Further, in the case that photovoltaic energy is sufficient and a battery has been fully charged, the supplying the photovoltaic energy to a load, to prohibit photovoltaic excess energy from charging the lithium battery includes the following specific steps.

When the battery is fully charged, and soc of the battery reaches 100%, setting IchargeLimit to zero, which indicates that the battery is not allowed to be charged; when an actual current is a positive value, turning off the control loop 4 and setting IbatRef1 to −0.5 A to keep the battery in a discharging state, where in this case, photovoltaic energy is sufficient to supply the load, the battery is in a discharging state, and the bus voltage Ubus increases. When the bus voltage is higher than PvBusRef, according to the control loop 2, the difference between PvBusRef and Ubus passes through the controller PI to output IpvRef2, IpvRef2 decreases, and a minimum value of IpvRef1 and IpvRef2 is used as the reference value IpvRef of the PV side current, so that IpvRef also decreases, an output power of the photovoltaic component is finally reduced. If the load is in a no-load in this case, the output power of the photovoltaic component decreases to zero, and the bus voltage still increases. When the bus voltage is higher than BatOvBusRef, according to the control loop 5, the difference between BatOvBusRef and Ubus passes through the controller PI to output IbatRef2, IbatRef2 increases, and a maximum value of IbatRef1 and IbatRef2 is used as a reference value IbatRef of current of the battery, so that IbatRef also increases, battery discharge current is reduced, and the bus voltage Ubus is maintained at BatOvBusRef.

Further, in the case that photovoltaic energy is insufficient, the jointly supplying the photovoltaic energy and battery energy to a load, to achieve maximum power point tracking of an output power of a photovoltaic component includes the following specific steps. When photovoltaic energy is insufficient to maintain the load, the bus voltage Ubus is reduced. When the bus voltage Ubus is less than BatBusRef, according to the control loop 4, the difference between BatBusRef and Ubus passes through the controller PI to output a value, and the value decreases until the value is less than 0, indicating that discharge of the battery is required to maintain the bus voltage. Because BatBusRef is equal to PvBusRef−5, the bus voltage is maintained at PvBusRef−5.

According to the control loop 2, the difference between PvBusRef and the bus voltage Ubus passes through the controller PI to output IpvRef2, and because Ubus is maintained at PvBusRef−5, IpvRef2 reaches a saturation value. A minimal value of IpvRef1 and IpvRef2 is used as the reference value IpvRef of the PV side current, because IpvRef2 reaches a saturation value, IpvRef is equal to IpvRef1. Thus, in this case, the reference value of the control loop 3 is directly obtained from the control loop 1, and a reference value UpvRef of the control loop 1 is the target value of the MPPT, so that maximum power point tracking control of the photovoltaic component may be implemented.

Further, in the case that there is no photovoltaic energy, the supplying battery energy to a load includes: when there is no output for the photovoltaic component due to too weak light, a PV side DC/DC boost circuit is in an off state in this case, and the control loops 1, 2, and 3 are turned off.

According to the control loop 4, the difference between BatBusRef and Ubus passes through the controller PI, to output a negative value, indicating that discharge of the battery is required to maintain the bus voltage, finally the battery discharges. The bus voltage is maintained at BatBusRef, and then an alternating current voltage is generated on an output side through a DC/AC inverter circuit to provide energy for the load.

DETAILED DESCRIPTION OF THE EMBODIMENTS

To better understand an objective, structure, and function of the present application, the following further describes a method for controlling battery charging/discharging current in an off-grid mode of a hybrid energy storage inverter according to the present application in detail with reference to the accompanying drawings.

Figure 1:
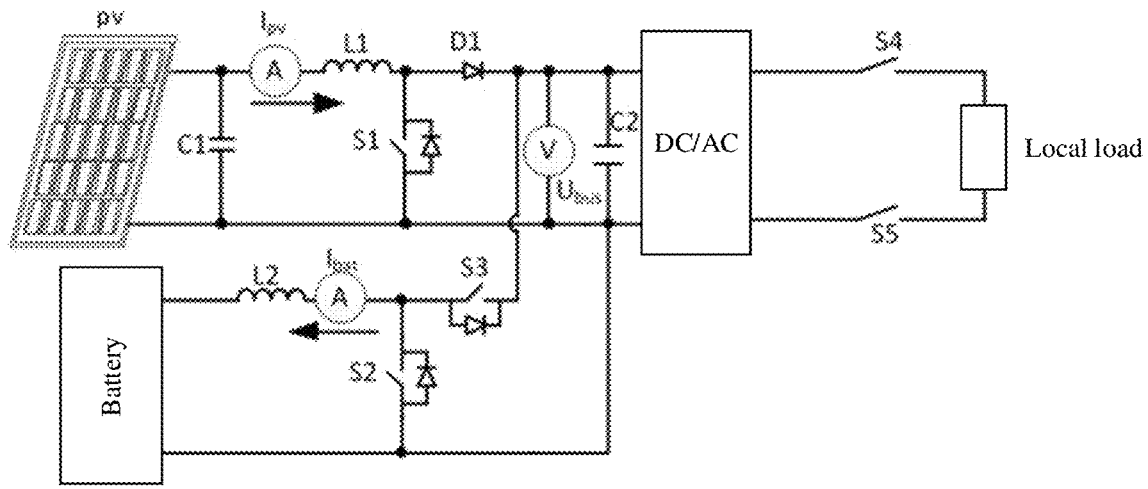
FIG. 1 is a circuit principle diagram of a hybrid energy storage inverter based on photovoltaic and a lithium battery according to the present application.

FIG. 1 is a circuit principle diagram of a hybrid energy storage inverter based on photovoltaic and a lithium battery. The present application provides a method for controlling battery charging/discharging current in an off-grid mode of a hybrid energy storage inverter that is based on photovoltaic and a lithium battery, including following steps.

Setting a bus voltage reference value.

When the hybrid energy storage inverter works in an off-grid mode, an alternating current power with an effective value of 220V is provided for a load side, a standard direct current bus voltage reference value is set to StandardBusRef, a PV side bus voltage reference value is set to PvBusRef, and a battery side bus voltage reference value is set to BatBusRef. To enable a DC/AC inverter circuit to meet an alternating current voltage output condition, a standard direct current bus voltage reference value is set to BatOvBusRef, where StandardBusRef=Urms*1.414+35, and Urms denotes an effective value of a voltage.

When an output voltage reference value UpvRef of an MPPT algorithm is less than StandardBusRef, a DC/DC control circuit on a PV side works in a boost mode; and in this case, PvBusRef=StandardBusRef.

When an output voltage reference value UpvRef of an MPPT algorithm is greater than or equal to StandardBusRef, a DC/DC control circuit on a PV side works in a bypass mode; and in this case, PvBusRef=UpvRef+5;

BatBusRef=PvBusRef−5; and
BatOvBusRef=PvBusRef+20.

Controlling on a PV side and a battery side.

Figure 2:
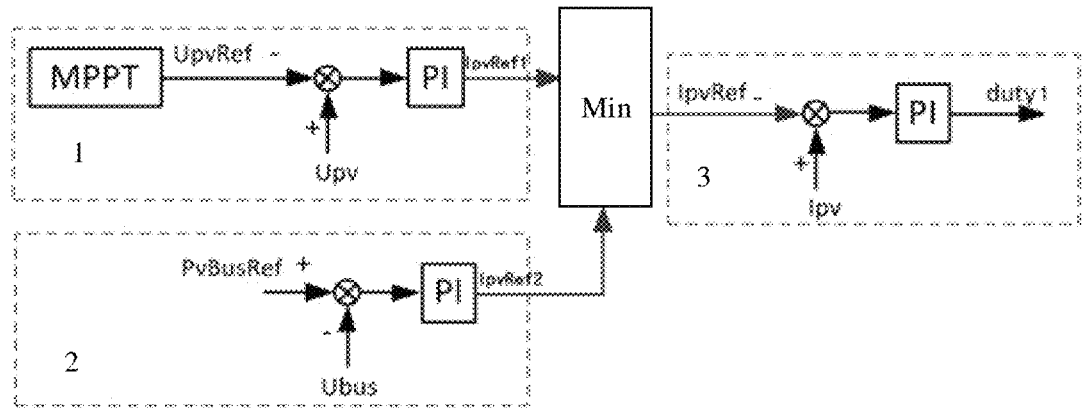
FIG. 2 is a block diagram of PV side control according to the present application.

Controlling on a PV side. As shown in FIG. 2, controlling of the PV side includes a control loop 1, a control loop 2, and a control loop 3, a target value UpvRef of maximum power point tracking MPPT of a photovoltaic component is shown in the control loop 1, and a difference between UpvRef and a current output voltage Upv of the photovoltaic component passes through a controller PI, to output IpvRef1. As shown in the control loop 2, a difference between PvBusRef and a bus voltage Ubus passes through a controller PI, to output IpvRef2. A minimal value of IpvRef1 and the IpvRef2 is used as a reference value IpvRef of the control loop 3, a difference between IpvRef and an output current Ipv of the photovoltaic component passes through a controller PI, to output a duty ratio control signal duty1 of a PV side DC/DC converter, and the duty1 is converted into a switch signal to control turning on and turning off of S1.

Figure 3:
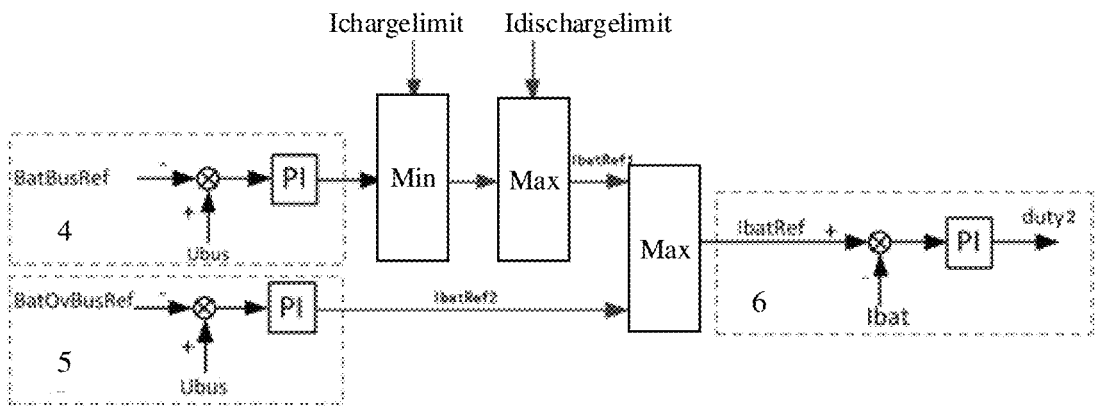
FIG. 3 is a block diagram of battery side control according to the present application.

Controlling on a battery side. As shown in FIG. 3, controlling of the battery side includes a control loop 4, a control loop 5, and a control loop 6. As shown in the control loop 4, a difference between BatBusRef and a bus voltage Ubus passes through a controller PI to output a value, a minimal value of the value that is output and Ichargelimit is selected, and then a maximum value of the minimal value that is selected and Idischargelimit is used as a first reference value IbatRef1 of current of the battery.

Ichargelimit denotes a maximum allowable charging current value of the battery, Idischargelimit denotes a maximum allowable discharging current value of the battery, herein it is defined that a charging current of the battery is in a positive direction and a discharging current of the battery is in a negative direction, so that Ichargelimit is a value greater than or equal to zero, and Idischargelimit is a value less than or equal to zero.

As shown in the control loop 5, a difference between BatOvBusRef and a bus voltage Ubus passes through a controller PI, to output a second reference value IbatRef2 of current of the battery, and a maximum value of IbatRef1 and IbatRef2 is used as a reference value IbatRef of current of the battery for the control loop 6.

In the control loop 6, a difference between IbatRef and Ibat of current of the battery passes through a controller PI to output a duty ratio control signal duty2 of a battery side DC/DC converter, and the duty2 is converted into a switch signal to control turning on and turning off of S2 and S3.

Setting a specific control method in each state.

When the hybrid energy storage inverter works in an off-grid mode, and in a case that photovoltaic energy is sufficient and a battery is not fully charged, the photovoltaic energy is supplied to a load and excess energy is supplied to the battery to achieve maximum power point tracking of an output power of a photovoltaic component.

In this case, according to the control loop 4, the reference value BatBusRef is PvBusRef−5, so that when the bus voltage Ubus is greater than PvBusRef−5, an output of the control loop 4 is greater than 0, which indicates that the battery is being charged, and if the battery is not fully charged and the output of the control loop 4 is less than the charging current limit IchargeLimit, indicating that the charging current has not reached the limit value, then the bus voltage Ubus is maintained at PvBusRef−5. In this case, according to the control loop 2, the difference between PvBusRef and the bus voltage Ubus passes through the controller PI, to output IpvRef2, and because Ubus is maintained at PvBusRef−5, IpvRef2 reaches a saturation value. A minimal value of IpvRef1 and IpvRef2 is used as the reference value IpvRef of the PV side current, because IpvRef2 reaches a saturation value, IpvRef is equal to IpvRef1. Thus, in this case, the reference value of the control loop 3 is directly obtained from the control loop 1, and a reference value UpvRef of the control loop 1 is the target value of the MPPT, so that maximum power point tracking control of the photovoltaic component may be implemented.

When the hybrid energy storage inverter works in an off-grid mode, and in a case that photovoltaic energy is sufficient and a battery has been fully charged, the photovoltaic energy is supplied to a load, and excess photovoltaic energy is prohibited from charging the battery to prevent overcharging of the lithium battery.

In this case, the battery is fully charged, and soc of the battery reaches 100%, IchargeLimit is set to zero, which indicates that the battery is not allowed to be charged. However, in practice, due to sampling error, even if a charging current of the battery is limited to zero, an actual current may be a positive value or a negative value. When the actual current is a positive value, it indicates that the battery is being charged. In this case, the battery will be overcharged or damaged. To prevent the battery from being in a charging state, the control loop 4 is turned off and IbatRef1 is set to −0.5 A (herein −0.5 A is set according to an error range of a sampling circuit, and the purpose is to ensure that the battery is in a discharging state). In this case, photovoltaic energy is sufficient to supply the load, the battery is in a discharging state, and the bus voltage Ubus increases; when the bus voltage is higher than PvBusRef, according to the control loop 2, the difference between PvBusRef and Ubus passes through the controller PI to output IpvRef2, IpvRef2 decreases, and a minimum value of IpvRef1 and IpvRef2 is used as the reference value IpvRef of the PV side current, so that IpvRef also decreases, an output power of the photovoltaic component is finally reduced. If the load is in a no-load in this case, the output power of the photovoltaic component decreases to zero, and the bus voltage still increases. When the bus voltage is higher than BatOvBusRef, according to the control loop 5, the difference between BatOvBusRef and Ubus passes through the controller PI to output IbatRef2, IbatRef2 increases, and a maximum value of IbatRef1 and IbatRef2 is used as a reference value IbatRef of current of the battery, so that IbatRef also increases, battery discharge current is reduced, and the bus voltage Ubus is maintained at BatOv-BusRef. Therefore, when the hybrid energy storage inverter works in an off-grid mode, and the photovoltaic energy is sufficient and the battery has been fully charged, in any load condition, the battery may be prevented from being continuously charged to an overvoltage state.

When the hybrid energy storage inverter works in an off-grid mode, and in a case that photovoltaic energy is insufficient, the photovoltaic energy and battery energy are jointly supplied to a load, to achieve maximum power point tracking an output power of a photovoltaic component achieves maximum power point tracking.

In this case, when photovoltaic energy is insufficient to maintain the load, the bus voltage Ubus is reduced. When the bus voltage Ubus is less than BatBusRef, according to the control loop 4, the difference between BatBusRef and Ubus passes through the controller PI to output a value, and the value decreases until the value is less than 0, indicating that discharge of the battery is required to maintain the bus voltage. Because BatBusRef is equal to PvBusRef−5, the bus voltage is maintained at PvBusRef−5.

According to the control loop 2, the difference between PvBusRef and the bus voltage Ubus passes through the controller PI to output IpvRef2, and because Ubus is maintained at PvBusRef−5, IpvRef2 reaches a saturation value. A minimal value of IpvRef1 and IpvRef2 is used as the reference value IpvRef of the PV side current, because IpvRef2 reaches a saturation value, IpvRef is equal to IpvRef1. Thus, in this case, the reference value of the control loop 3 is directly obtained from the control loop 1, and a reference value UpvRef of the control loop 1 is the target value of the MPPT, so that maximum power point tracking control of the photovoltaic component may be implemented.

When the hybrid energy storage inverter works in an off-grid mode, and in a case that there is no photovoltaic energy, battery energy is supplied to a load.

In this case, when there is no output for the photovoltaic component due to too weak light, a PV side DC/DC boost circuit is in an off state in this case, and the control loops 1, 2, and 3 are turned off.

According to the control loop 4, the difference between BatBusRef and Ubus passes through the controller PI, to output a negative value, indicating that discharge of the battery is required to maintain the bus voltage. Finally, the battery discharges and the bus voltage is maintained at BatBusRef, then an alternating current voltage is generated on an output side through a DC/AC inverter circuit to provide energy for the load.

It may be understood that the present application is described by using some embodiments. Persons skilled in the art understand that, without departing from the spirit and scope of the present application, various changes or equivalent replacements may be performed on these features and embodiments. In addition, with the teachings of the present application, these features and embodiments may be modified to accommodate specific cases and materials without departing from the spirit and scope of the present application. Therefore, the present application is not limited by the specific embodiments disclosed herein, and all embodiments falling within the scope of the claims of the present application fall within the protection scope of the present application.

What is claimed is:

1. A method for controlling battery charging/discharging current in an off-grid mode of a hybrid energy storage inverter that is based on photovoltaic and a lithium battery, comprising:
   setting a bus voltage reference value;
   controlling on a photovoltaic (PV) side and a battery side; and
   setting a specific control method in each state, wherein the specific control method comprises:
      in a case that photovoltaic energy is sufficient and a battery is not fully charged, supplying the photovoltaic energy to a load and excess energy to the battery, to achieve maximum power point tracking of an output power of a photovoltaic component;
      in a case that photovoltaic energy is sufficient and a battery has been fully charged, supplying the photovoltaic energy to a load, to prohibit photovoltaic excess energy from charging the lithium battery;
      in a case that photovoltaic energy is insufficient, jointly supplying the photovoltaic energy and battery energy to a load, to achieve maximum power point tracking of an output power of a photovoltaic component; or
      in a case that there is no photovoltaic energy, supplying battery energy to a load.

2. The method according to claim 1, wherein the setting a bus voltage reference value comprises:
   when the hybrid energy storage inverter works in an off-grid mode, providing an alternating current power supply with an effective value of 220V for a load side, and setting a standard direct current bus voltage reference value to StandardBusRef, a PV side bus voltage reference value to PvBusRef, a battery side bus voltage reference value to BatBusRef, and a battery side bus overvoltage reference value to BatOvBusRef, to enable a DC/AC inverter circuit to meet an alternating current voltage output condition, wherein the standard direct current bus voltage reference value that is set is StandardBusRef=Urms*1.414+35, and Urms denotes an effective value of a voltage; and
   when an output voltage reference value UpvRef of an MPPT algorithm is less than StandardBusRef, a DC/DC control circuit on a PV side works in a boost mode; and in this case, PvBusRef=StandardBusRef;
   when an output voltage reference value UpvRef of an MPPT algorithm is greater than or equal to StandardBusRef, a DC/DC control circuit on a PV side works in a bypass mode; and in this case, PvBusRef=UpvRef+5;
   BatBusRef=PvBusRef−5; and
   BatOvBusRef=PvBusRef+20.

3. The method according to claim 2, wherein the controlling on a PV side and a battery side comprises:
   wherein controlling of the PV side comprises a control loop 1, a control loop 2, and a control loop 3, in the control loop 1, a difference between a target value UpvRef from maximum power point tracking MPPT of the photovoltaic component and a current output voltage Upv of the photovoltaic component passes through a controller PI, to output IpvRef1; in the control loop 2, a difference between PvBusRef and a bus voltage Ubus passes through a controller PI, to output IpvRef2; and a minimal value of IpvRef1 and the IpvRef2 is used as a reference value IpvRef of the control loop 3, in the control loop 3, a difference between IpvRef and an output current Ipv of the photovoltaic component passes through a controller PI, to output a duty ratio control signal duty1 of a PV side DC/DC converter, and the duty1 is converted into a switch signal to control turning on and turning off of S1; or controlling of the battery side comprises a control loop 4, a control loop 5, and a control loop 6, and in the control loop 4, a difference between BatBusRef and a bus voltage Ubus passes through a controller PI to output a value, a minimal value of the value that is output and Ichargelimit is selected, and then a maximum value of the minimal value that is selected and Idischargelimit is used as a first reference value IbatRef1 of current of the battery, wherein Ichargelimit denotes a maximum allowable charging current value of the battery, Idischargelimit denotes a maximum allowable discharging current value of the battery, and it is defined that a charging current of the battery is in a positive direction and a discharging current of the battery is in a negative direction, so that Ichargelimit is a value greater than or equal to zero, and Idischargelimit is a value less than or equal to zero; and in the control loop 5, a difference between BatOvBusRef and a bus voltage Ubus passes through a controller PI, to output a second reference value IbatRef2 of current of the battery, and a maximum value of IbatRef1 and IbatRef2 is used as a reference value IbatRef of current of the battery for the control loop 6; and in the control loop 6, a difference between IbatRef and Ibat of current of the battery passes through a controller PI to output a duty ratio control signal duty2 of a battery side DC/DC converter, and the duty2 is converted into a switch signal to control turning on and turning off of S2 and S3.

4. The method according to claim 3, wherein in the case that photovoltaic energy is sufficient and a battery is not fully charged, the supplying the photovoltaic energy to a load and excess energy to the battery, to achieve maximum power point tracking of an output power of a photovoltaic component comprises:

according to the control loop 4, the reference value BatBusRef is PvBusRef−5, so that when the bus voltage Ubus is greater than PvBusRef−5, an output of the control loop 4 is greater than 0, which indicates that the battery is being charged, and if the battery is not fully charged and charge flow IchargeLimit is not limited, the bus voltage Ubus is maintained at PvBusRef−5; in this case, according to the control loop 2, a difference between PvBusRef and the bus voltage Ubus passes through a controller PI, to output IpvRef2, and because Ubus is maintained at PvBusRef−5, IpvRef2 reaches a saturation value; a minimal value of IpvRef1 and IpvRef2 is used as the reference value IpvRef of the PV side current, because IpvRef2 reaches a saturation value, IpvRef is equal to IpvRef1, in this case, the reference value of the control loop 3 is directly obtained from the control loop 1, and a reference value UpvRef of the control loop 1 is the target value of the MPPT, so that maximum power point tracking control of the photovoltaic component is capable of being implemented.

5. The method according to claim 3, wherein in the case that photovoltaic energy is sufficient and a battery has been fully charged, the supplying the photovoltaic energy to a load, to prohibit photovoltaic excess energy from charging the lithium battery comprises:

when the battery is fully charged, and soc of the battery reaches 100%, setting IchargeLimit to zero, which indicates that the battery is not allowed to be charged; turning off the control loop 4, setting IbatRef1 to −0.5 A to keep the battery in a discharging state, wherein in this case, photovoltaic energy is sufficient to supply the load, the battery is in a discharging state, and the bus voltage Ubus increases; when the bus voltage is higher than PvBusRef, according to the control loop 2, the difference between PvBusRef and Ubus passes through the controller PI to output IpvRef2, IpvRef2 decreases, and a minimum value of IpvRef1 and IpvRef2 is used as the reference value IpvRef of the PV side current, so that IpvRef also decreases, an output power of the photovoltaic component is finally reduced, and if the load is in a no-load in this case, the output power of the photovoltaic component decreases to zero, and the bus voltage still increases; and when the bus voltage is higher than BatOvBusRef, according to the control loop 5, the difference between BatOvBusRef and Ubus passes through the controller PI to output IbatRef2, IbatRef2 increases, and a maximum value of IbatRef1 and IbatRef2 is used as a reference value IbatRef of current of the battery, so that IbatRef also increases, battery discharge current is reduced, and the bus voltage Ubus is maintained at BatOvBusRef.

6. The method according to claim 3, wherein in the case that photovoltaic energy is insufficient, the jointly supplying the photovoltaic energy and battery energy to a load, to achieve maximum power point tracking of an output power of a photovoltaic component comprises:

when photovoltaic energy is insufficient to maintain the load, reducing the bus voltage Ubus, wherein when the bus voltage Ubus is less than BatBusRef, according to the control loop 4, the difference between BatBusRef and Ubus passes through the controller PI to output a value, the value decreases until the value is less than 0, indicating that discharge of the battery is required to maintain the bus voltage, and because BatBusRef is equal to PvBusRef−5, the bus voltage is maintained at PvBusRef−5;

according to the control loop 2, the difference between PvBusRef and the bus voltage Ubus passes through the controller PI, to output IpvRef2, and because Ubus is maintained at PvBusRef−5, IpvRef2 reaches a saturation value; and a minimal value of IpvRef1 and IpvRef2 is used as the reference value IpvRef of the PV side current, because IpvRef2 reaches a saturation value, IpvRef is equal to IpvRef1, in this case, the reference value of the control loop 3 is directly obtained from the control loop 1, and a reference value UpvRef of the control loop 1 is the target value of the MPPT, so that maximum power point tracking control of the photovoltaic component is capable of being implemented.

7. The method according to claim 3, wherein in the case that there is no photovoltaic energy, the supplying battery energy to a load comprises, when there is no output for the photovoltaic component due to too weak light, a PV side DC/DC boost circuit is in an off state, in this case, and the control loops 1, 2, and 3 are turned off; and according to the control loop 4, the difference between BatBusRef and Ubus passes through the controller PI, to output a negative value, indicating that discharge of the battery is required to maintain the bus voltage, finally the battery discharges, the bus voltage is maintained at BatBusRef, and then an alternating current voltage is generated on an output side through a DC/AC inverter circuit to provide energy for the load.

\* \* \* \* \*